UNITED STATES PATENT OFFICE.

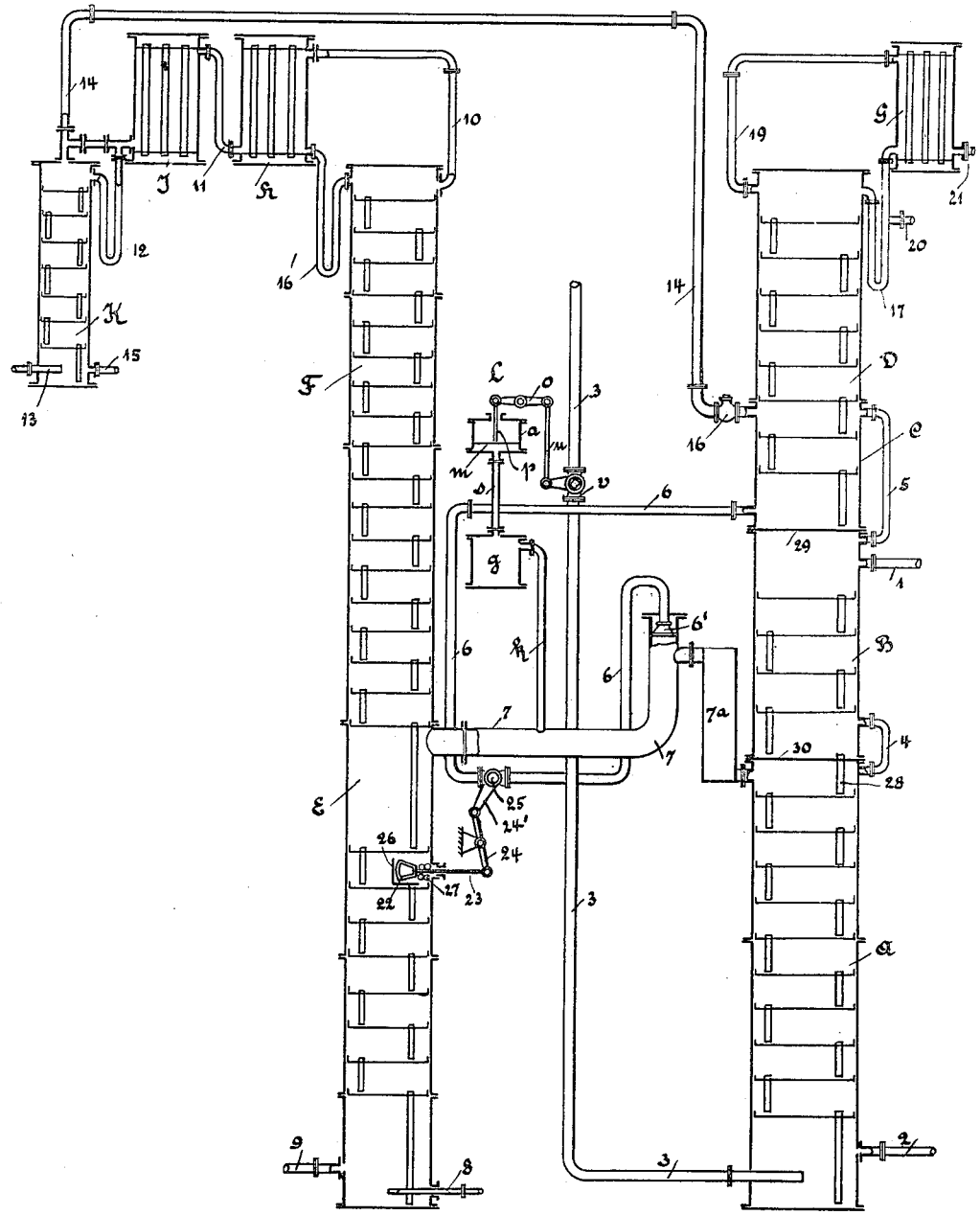

VICTOR SLAVÍČEK, OF VIENNA, AUSTRIA-HUNGARY.

CONTINUOUS PROCESS FOR THE DISTILLATION AND RECTIFICATION OF ALCOHOLIC LIQUIDS.

1,136,559.       Specification of Letters Patent.       Patented Apr. 20, 1915.

Application filed October 29, 1908. Serial No. 460,107.

*To all whom it may concern:*

Be it known that I, VICTOR SLAVÍČEK, a subject of the Austro-Hungarian Emperor, and resident of 45 Strozzigasse, VIII, Vienna, Austria-Hungary, have invented certain new and useful Improvements in Continuous Processes for the Distillation and Rectification of Alcoholic Liquids, of which the following is a specification.

The present invention relates to a process for the continuous distillation and rectification of spirits obtained by the usual process. The spirits, produced either direct from the mash or from raw spirits or wine, possess always a very unpleasant ordor even if chemical impurities cannot be traced and the greatest care in the production has prevailed. This odor is created first by the vapors to be purified passing the concentrated last-runnings covering the partitions of the rectifying column and according to the strength of the degree of concentration will be more or less noticeable. Secondly they are caused by the fact that the crude vapors or phlegms, that is all liquids, which remain unvaporized in any part of the apparatus, even if they are freed from the "fore-runnings" before entering the rectifying column will become impure during the long purifying process by oxidation through the intaking of air during the irregular working of the apparatus or for instance the irregular taking in of mash or steam, or by the irregular cooling off, etc.

The object of this invention is a continuous process for distilling and rectifying alcoholic liquids which obviates the aforesaid defects and assures a complete purification and the removal of all unpleasant odors.

The improved process consists mainly in the following: First in dividing the crude vapors. One part of the same is passed through a preliminary purifier from which the boiling-hot phlegms of this part, purified from the fore-runnings are introduced in a fine spray and in one direction into the second part of the crude vapors which is free from "fore-runnings" but contains "last-runnings". The second part yields the alcohol only in vapor form and also absorbs the last-runnings of the crude vapors so that without extra cooling or re-vaporization pure vapors are obtained while in the rectifying column occurs a reduced concentration and a lower level of the last-runnings. The reactions which are obtained through this process may be noted from the examples as shown farther on. Second all non-condensed impurities generated or carried into the rectifying column are returned as vapor to the first purifier for heating purposes. Third an exact equalizing and automatic regulating of the pressure in the various parts of the apparatus is obtained by means of a particular circulation.

The accompanying drawing shows in section in a diagrammatic form a distilling and rectifying apparatus for carrying out the above described process.

Material entering through the inlet 1 into the upper part of the distillation column or still B is practically purified from the fore-runnings in B, and leaves at the lower end of the column A through a pipe 2. The stream of water vapor flowing into the mash is introduced through the pipe 3 at the lower part of the column A and in penetrating the mash becomes saturated with crude-vapors extracted from the same. A solid partition 30 closes for the rising steam the direct communication between A and B, whereas the liquid can flow downward through the pipe 28. In the upper part of the column A, a part of the crude-vapors in suitable quantity is carried by the pipe connection 4 into the column B and thence through a similar pipe 5 into the purifier C, D. The direct connection between B and C is closed for the steam as well as for the liquid by the partition 29, whereas C and D communicate. From the upper part of the column C, D the volatile fore-runnings escape through the pipe 19, whereas the hot alcoholic phlegms, which are free from fore-runnings, collect above the partition 29. From here the latter by means of the pipe 6 and the sprinkler 6' are brought into the pipe 7 in form of a fine spray in close intermingling with the second unpurified part of the crude-vapors which are free from fore-runnings coming from the distillation column A. From pipe 7 the vapors pass to the rectifying column F which is mounted on the column E provided at the lower part with a steam inlet 8 and a water outlet 9. The crude-vapors are relieved of a great amount of last-runnings adhering thereto in fine drops by introducing the phlegms into pipe 7 in a fine spray and in one direction whereby one part of the ill smelling end-products is absorbed, like dust in the air by rain, from the finely sprinkled, downward dropping hot phlegms and is abstracted with the same in a known way. The purification occurs in this manner that the phlegms from the column C in a boiling hot state, in meeting the crude-vapors discharge from themselves the alcohol as vapor and absorb, while drizzling downward, from the crude-vapors the last-runnings and become saturated therewith. This mode of purifying the vapors by the hot-phlegms is much more effective than the purification by condensation, also from an economical stand point the saving in cooling, heating and working has to be taken into consideration. Furthermore, in purifying the crude-vapors by equally strong phlegms a carrying along of the last-runnings, which usually takes place when boiling alcoholic liquors, is entirely avoided. To prevent the entrance of mash or foam from the distilling column A into the pipe 7, or its being carried along by the vapors, a receptacle 7ª is provided between the pipe 7 and the column A. By the described working manner much purer crude-vapors enter the rectification column which have already lost most of the ill smelling last-runnings whereby a very much lower concentration of the last-runnings and a lower form of column is required, or in other words it extends over a smaller number of partition or bottom plates facilitating thereby the rectification considerably. From the column F the already very pure vapors reach through the pipe 10 the dephlegmator H and are here dephlegmated under the highest possible temperature. The phlegms are returned through pipe 16' to the column F and the rest of the vapors reach through pipe 11 the condenser J where again condensation takes place at the highest possible temperature. The higher the temperature of the dephlegmation and the condensation are, the purer and more odorless the fine-product obtained will be. The alcoholic phlegms are conducted through the pipe 12 into the column K and are here once more rectified by steam, let in through the pipe 13. The fine-product or spirits is drawn off from the column K by the pipe 15, whereas the discharged volatile products commingle with the non-condensed parts coming from the condenser I and are conducted back in vapor form, containing all their heat, through the pipe 14 into the head-product purifier C, D on a place of less counter pressure, where they act as heating means and are subjected to a common treatment with the first part of the crude-vapors. In this manner all prime-products or fore-runnings and the volatile products generated by the process are conducted circulating in vapor form to the universal purifier D. The non-condensed parts escaping therefrom through the pipe 19, are again dephlegmated in G and are taken off finally through pipe 21. The phlegms of G are continuously returned partly through the pipe 17 to the head-product purifier D and are continuously discharged partly through the pipe 20. Thus a continuous circulation or circuit from the rectifying column to the distilling column respectively the prime-product purifier takes place, whereby eventually occurring pressure differences in the apparatus are automatically equalized. Only hereby, in connection with the rectifying, dephlegmating and condensing at the highest possible temperature is it possible to obtain an equally pure, odorless fine-product, even if the handling of the apparatus should become irregular from one source or the other.

To prevent impure vapors penetrating through the pipe 14 into the final purifier column K, a back-pressure valve is provided in this pipe connection.

An increase of pressure in column A, B is followed by a respective acceleration of the processes in column E, F and by a non-sufficient action of the apparatus H, I and K which action on account of the connection through pipe 14 is also transmitted to the head-product purifier C, D. In the same manner an undesirable change of the pressure in any one part of the apparatus acts disturbingly on all the other parts. It is therefore of great importance to regulate the vaporization in column A according to the pressure in columns E and F and condenser I and dephlegmator H in such a manner that occurring pressure variations are automatically regulated. According to the present invention this is effected in an extraordinarily efficient way by the steam regulator L of ordinary construction, which regulates the steam inflow in the pipe 3 according to the steam pressure in pipe 7. In the drawing this regulator is shown as a diaphragm regulator consisting of a lower condensing receptacle $g$ which is connected by the pipe $k$ to the pipe 7 and by means of the nozzle $s$ with the diaphragm compartment $a$ and the diaphragm $m$. The raising or lowering of the diaphragm $m$ according to the increase or decrease of steam pressure in the pipe 7 respectively in the columns A and E, F or in the column C, D is transmitted by means of the rod $p$ and the double-arm lever $o$ to the rod $u$ manipulating the valve $v$, whereby the steam inlet through the pipe 3 to A is regulated according to the prevailing pressure in the interior of the columns. By the peculiar location of the regulator L the steam inlet and thereby the pressure in the column A is regulated from a spot, the pressure of which is equally governed from all parts of the apparatus in such a manner, that if there occurred on any one point an unfavorable change of pressure, it will change the pressure in the column A so that the equilibrium in the circulation is restored. From the same regulator the steam inlet into any other part can be regulated in a like effective manner; at any disturbance of the pressure through the action of the regulator an automatic restoring of the pressure in the circulation takes always place.

For a regular working of the entire apparatus it is finally imperative to regulate the quantities of the unclean or partly cleaned liquors introduced into the parts according to the quantity of alcohol leaving the column at the same time. Then, should, during a longer period more fine-spirits have been let off through the pipe 15 than for example the amount of phlegms flowing in through the pipe 6, the end-runnings will show themselves in the rectifying column in too high a column or vice versa. Hereby the purity of the product becomes subjected to great variations. It has now been determined that the temperature in the column E, F is a good rule for measuring the right proportions between the quantities of fine spirits taken off at 15, and the new quantity of liquor conducted at the same time into the various parts of the apparatus, and which can be used for an exact reciprocal regulation of the same.

In the drawing, in a constructional form, is shown the device for regulating the quantity of the phlegms passing through the pipe 6, which arrangement is very effective as thereby indirectly, at the same time, the quantities of the end-products of the head or fore-runnings carried into the column E, F, which fore-runnings flow off through the pipe 8, as well as the pressure in the columns A, C, B, D, is accordingly regulated.

On that part of the rectifying column which is subjected to the greatest variations in temperature, a closed, flat expansion case or capsule 22 is provided. The case 22 is filled with a suitable liquor, bears on one side on the wall 26 and is connected to a rod 23 which actuates the two-arm lever 24. The latter, by means of the arm 24', actuates the cock 25 interposed in the pipe connection 6. At rising temperature the capsule 22 expands, presses the rod 23 outward and opens thereby, by means of the levers 24, 24' and the cock 25 the pipe connection 6 more and more. This causes more phlegm to run over to E, the temperature falls, the capsule 22 contracts and closes the pipe connection gradually. The sliding back of the rod 23 is accelerated by a spring 27. In the same manner the inflow of the mash into column A and the outflow of the water, etc., of the fore-runnings can be regulated.

Through the conduit there will be introduced into the distilling column A B every hour about 500 liters of a molasses mash of about 12° Baumé and of the following composition: ethyl alcohol 8%, fore-runnings 0.25% (of aldehyde 0.15%, other volatile products 0.1%), water 80%, last-runnings, products 0.25%, of which 0.2% is amyl alcohol, 11.5% organic and inorganic salts. To the mash flowing down over the bottom of the column A B there will be conducted through pipe 3 steam at 5 atmospheres, corresponding to 154° C. in a counterflow, which steam drives out the alcohol, the fore-runnings and a part of the last-runnings. At the pipe 2 there pass out each hour about 4200 liters of slop, containing only about 6% of organic substance (salt). The mean temperature in column A amounts to 103° C., in B 100° C. Of the 400 liters of pure ethyl alcohol introduced through inlet 1, there pass over through 5 about 300 liters in the form of vapor and laden with preliminary products to C, D, where there prevails a mean temperature of 84° C. and a pressure of about 1600 mm. On the other hand through 7ª and 7 there pass over every hour about 100 liters in the form of vapor, which contain no fore-runnings but do contain the last-runnings in the form of finely divided droplets. To these vapors there will be conducted through 6 the phlegms or crude vapors free from fore-runnings coming from C, D and having a temperature of 82° C. and a content of 50% of ethyl alcohol through the spray 6, and between these there takes place the change described above. The preferred temperature at the place where the conduit $k$ goes out from the pipe 7 is 84° C. From 7 there passes a very pure vapor with 35% alcohol into the rectifying column F, while the fore-runnings flowing off to E contain nearly all the last-runnings and about 50% ethyl alcohol. Into the column E, there is introduced through 9 steam at 5 atmospheres, while at 8 there flow off per hour 400 liters of water, containing the whole of the last-runnings. There prevails a normal temperature of 86° C., and this falls on its way to the highest floor of the column F successively to 81.5° C. The vapors passing out through 10 contain already 96.4% of ethyl alcohol and are dephlegmated in the dephlegmator H at 70.5° C., the vapors leaving H are condensed in J at 77° C. and these phlegms are again rectified in 12 by steam at 140° C. introduced at 13. At 15 there flows off continually (hourly) a quantity of about 365 liters of refined alcohol with a content of 97% ethyl alcohol. The products not condensed in the columns F, H, J and K are carried back through 14 at a temperature of 81° C. into fore-runnings purifier C, D, as heating agent. The volatile products escaping from the purifier column D through 19 are again dephlegmated at G at 70° C. From the most volatile products coming out at 21 there is obtained an hourly quantity of about 32 liters of a condensate, consisting of 3% aldehyde and 93% alcohol, while the remainder is other volatile products specially esters. The condensed superfluous fore-runnings products can be let off at 20, while every hour about 50 liters flow back through 17 to D.

At all points of the plant there are placed thermometers and pressure gages so that the temperatures and pressures can easily be observed. The specific weights of the distillates are determined by areometers. On starting the plant the work is carried on by regulating the steam inlet at 3, 9 and 15 and the cock 16, until the conditions of temperature, pressure and passage are attained. After that the whole plant regulates itself perfectly by means of the arrangements L and 22 in the way described above.

When the apparatus is once started, one need do nothing further in manipulating the same, as the entire process will regulate itself.

The described device for carrying out distillation assures the production of a very pure product at an automatic regulated running of the apparatus at a continuous working.

What I claim as my invention and desire to secure by Letters Patent is:—

1. The process for the continuous distillation and rectification of alcoholic liquids, which consists in dividing the alcoholic raw vapor into two portions, purifying the non-cooled phlegms of one portion of the head products, and introducing the same immediately at the beginning of the rectification into the alcoholic raw vapor of the second portion.

2. The process for the continuous distillation and rectification of alcoholic liquids, which consists in dividing the alcoholic raw vapor into two portions, purifying the non-cooled phlegms of one portion of the head products, and introducing the same immediately at the beginning of the rectification into the alcoholic raw vapor of the second portion, previously depriving the said portion of the head products but leaving the tail products.

3. The process for the continuous distillation and rectification of alcoholic liquids, which consists in dividing the alcoholic raw vapor into two portions, purifying the non-cooled phlegms of one portion of the head products, and introducing the same immediately at the beginning of the rectification into the alcoholic raw vapor of the second portion, previously depriving the said portion of the head products but leaving the tail products, and utilizing the mutual contact to vaporize the phlegms.

4. The process for the continuous distillation and rectification of alcoholic liquids, which consists in dividing the alcoholic raw vapor into two portions, purifying the non-cooled phlegms of one portion of the head products, and introducing the same immediately at the beginning of the rectification into the alcoholic raw vapor of the second portion, previously depriving the said portion of the head products but leaving the tail products, and utilizing the mutual contact to vaporize the phlegms, and impregnating the same with the tail products.

5. The process for the continuous distillation and rectification of alcoholic liquids, which consists in dividing the alcoholic raw vapor into two portions, purifying the non-cooled phlegms of one portion of the head products, and introducing the same immediately at the beginning of the rectification into the alcoholic raw vapor of the second portion, previously depriving the said portion of the head products but leaving the tail products, and utilizing the mutual contact to vaporize the phlegms, and impregnating the same with the tail products, preventing the same from becoming saturated with alcohol.

6. The process for the continuous distillation and rectification of alcoholic liquids, which consists in dividing the alcoholic raw vapor into two portions, purifying the non-cooled phlegms of one portion of the head products, and introducing the same immediately at the beginning of the rectification into the alcoholic raw vapor of the second portion, previously depriving the said portion of the head products but leaving the tail products, and utilizing the mutual contact to vaporize the phlegms, and impregnating the same with the tail products, preventing the same from becoming saturated with alcohol, then passing the alcoholic vapor into a rectifying column.

7. The process for the continuous distillation and rectification of alcoholic liquids, which consists in dividing the alcoholic raw vapor into two portions, purifying the non-cooled phlegms of one portion of the head products, and introducing the same immediately at the beginning of the rectification into the alcoholic raw vapor of the second portion, previously depriving the said portion of the head products but leaving the tail products, and utilizing the mutual contact to vaporize the phlegms, and impregnating the same with the tail products, preventing the same from becoming saturated with alcohol, then passing the alcoholic vapor into a rectifying column, then returning the impurities in vapor form to utilize the heat thereof.

8. The process for the continuous distillation and rectification of alcoholic liquids, which consists in dividing the alcoholic raw vapor into two portions, purifying the non-cooled phlegms of one portion of the head products, and introducing the same immediately at the beginning of the rectification into the alcoholic raw vapor of the second portion, previously depriving the said portion of the head products but leaving the tail products, and utilizing the mutual contact to vaporize the phlegms, and impregnating the same with the tail products, preventing the same from becoming saturated with alcohol, then passing the alcoholic vapor into a rectifying column, and preventing the impurities from entering the rectifying column.

9. A process for the continuous distillation and rectification of alcoholic liquids wherein the crude alcohol vapors are divided into two parts, one containing all fore-runnings, one free from fore-runnings, the boiling phlegms of the first part, purified from the fore-runnings, are led in a fine spray in rain form and in one direction into the second part of the crude vapors which is free from fore-runnings, and that the vapors leaving the mixing compartment are rectified, dephlegmated and condensed.

10. A process for the continuous distillation and rectification of alcoholic liquids wherein the crude alcohol vapors are divided into two parts, one containing all fore-runnings, the other free from fore-runnings, the boiling hot phlegms of the first part purified from the fore-runnings, are led in a fine spray or rain form and in one direction into the second part of the crude vapors which is free from fore-runnings, that the vapors leaving the mixing compartment are rectified and that for the purpose of freeing the same of all odors and carried along impurities, the same are at the possible highest temperature dephlegmated and condensed.

11. A process for the continuous distillation and rectification of alcoholic liquids wherein the crude alcohol vapors are divided into two parts, one containing all fore-runnings, the other free from fore-runnings, the boiling hot phlegms of the first part, purified from the fore-runnings are led in a fine spray or rain form and in one direction into the second part of the crude oil vapors which is free from fore-runnings, that the vapors leaving the mixing compartment are rectified and for the purpose of freeing the same of all odors and carried along impurities are at a possible highest temperature dephlegmated and condensed and that the non-condensed parts in vapor form and containing all their heat are conducted into a zone of the preliminary purifier, which zone is free from any injurious counter-pressure and are subjected in circulation under automatic pressure regulation between these parts of the apparatus to a coöperative treatment with the first part of the crude vapors.

12. A process for the continuous distillation and rectification of alcoholic liquids wherein the crude alcohol vapors are divided into two parts, one containing all fore-runnings, the other free from fore-runnings, the phlegms of the first part purified from the fore-runnings are led in a fine spray or rain form and in one direction into the second part of the crude vapors which is free from fore-runnings, the vapor leaving the mixing compartment are rectified and for the purpose of freeing the same of all odor and carried along impurities are at a possible highest temperature dephlegmated and condensed and the non-condensed parts in vapor form and containing all their heat are conducted into a zone of the preliminary purifier, which zone is free from any injurious counter-pressure and are subjected in circulation under automatic pressure regulation between these parts of the apparatus to a coöperative treatment, with the first part of the crude vapors, and at the same time the steam-inlet to any one-part of the apparatus being in circuit is regulated by a regulator, which is located at a spot which is equally governed by pressure variation from all of the parts of the apparatus being in circuit.

13. A process for the continuous distillation and rectification of alcoholic liquids, wherein the crude alcohol vapors are divided into two parts, one containing all fore-runnings, the other free from fore-runnings, the boiling hot phlegms of the first part purified from the fore-runnings are led in a fine spray or rain form and in one direction into the second part of the crude vapors which is free from fore-runnings, the vapors leaving the mixing compartment are rectified and for the purpose of freeing the same of all odor and carried along impurities are at a possible highest temperature dephlegmated and condensed and the non-condensed parts in vapor form and containing all their heat are conducted into a zone of the preliminary purifier, which zone is free from any injurious counter-pressure and are subjected in circulation under automatic pressure regulation between these parts of the apparatus to a coöperative treatment with the first part of the crude vapors, and at the same time the steam-inlet to any one-part of the apparatus being in circuit is regulated which is located at a spot which is equally governed by pressure variation from all of the parts of the apparatus being in circuit, and the proportion between the volume of the extracted fine-product and of the liquid respectively phlegms flowing into the different columns as well as of the flowing off non-alcoholic liquid is regulated by a device which governs the flow of the liquids according to the temperature which prevails in the zone subjected to the greatest change of the temperature in the rectifying column.

In testimony whereof I have hereunto signed my name this 14th day of October, 1908, in the presence of two subscribing witnesses.

VICTOR SLAVÍČEK.

Witnesses:
ROBERT W. HEINGARTNER,
AUGUST FUGGER.